C. S. LOCKWOOD.
ROLLER BEARING WITH DUPLEX ROLLS.
APPLICATION FILED MAY 23, 1912.

1,112,303.

Patented Sept. 29, 1914.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING WITH DUPLEX ROLLS.

1,112,303.

Specification of Letters Patent.

Patented Sept. 29, 1914.

Application filed May 23, 1912. Serial No. 699,100.

*To all whom it may concern:*

Be it known that I, CHARLES S. LOCKWOOD, a citizen of the United States, residing at 289 Market street, Newark, county of Essex and State of New Jersey, have invented certain new and useful Improvements in Roller-Bearings with Duplex Rolls, fully described and represented in the following specification and the accompanying drawings, forming a part of the same.

This invention relates to roller bearings in which the hub and casing are provided at the middle of their length with an annular rib, and the rolls made in section to fit upon the hub and casing at opposite sides of the ribs.

The construction employed in this invention is especially adapted for use with rolls made of a spirally wound strand which has been found in practice to possess a very advantageous amount of elasticity; but upon the ends of such rolls the strand possesses a thin tapered edge which renders it unsuitable to rotate in contact with any abutting shoulder, like the contiguous surface of an annular rib, because of its chisel-shape.

The invention employs duplex rolls formed of two such roll-sections, with washers upon their adjacent inner ends to contact with the chisel edges of the roll-strand, and adapted to embrace the opposite sides of the ribs upon the hub and casing; and a loose spindle is shown combined with the roll-sections with collars at its opposite ends to resist the end thrust of such sections.

The invention will be understood by reference to the annexed drawing, in which—

Figure 1:
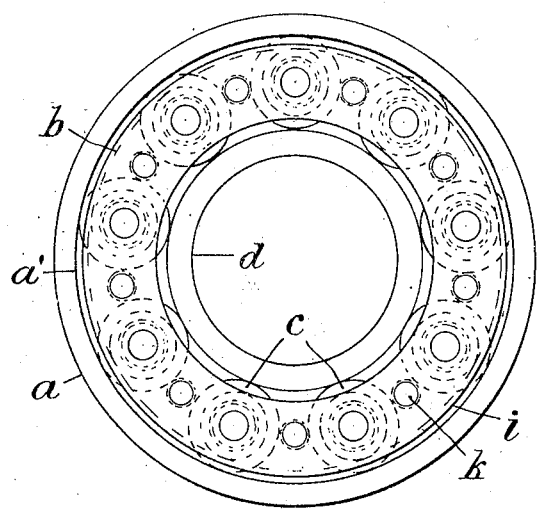
Figure 2:
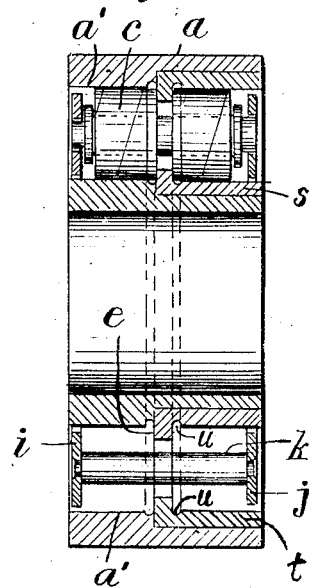
Figure 3:
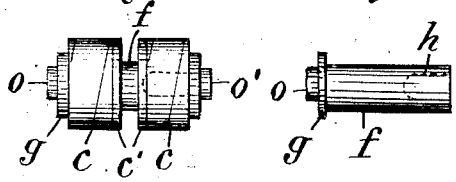
Figure 4:
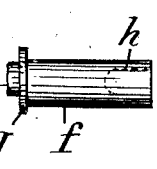
Figure 5:
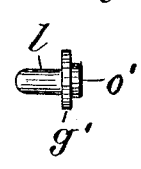

Figure 1 is an end view of a bearing embodying the improvements; Fig. 2 is a longitudinal section, where hatched, across the center line of such bearing; Fig. 3 is an elevation of one of the duplex rolls; Fig. 4 is an elevation of the spindle for such roll; and Fig. 5 is an elevation of a collared gudgeon for the spindle.

*a* designates the casing with an annular rib *b* at the middle of its length, which rib may be made separate to facilitate manufacture and seats *a'* at opposite sides of such collar to receive the roll-sections *c*. The hub *d* has an annular rib *e* at the middle of its length, which is thus opposite to the rib *b* in the casing. The roll-sections *c* are shown mounted losely upon a spindle *f* with a loose washer *c'* against the inner end of each roll to contact with the ribs in the casing. The spindle *f* has an integral collar *g* at one end and a non-integral collar *g'* upon the opposite end, which latter collar is formed upon a gudgeon *l* constructed to fit tightly in a socket *h* in the end of the spindle *f*, as is indicated in dotted lines in Fig. 4. The spindle and the gudgeon are provided respectively with journals *o* and *o'* upon their outer ends to revolve in holes in the heads *i* and *j* of a cage which guides the rolls in the casing. The cage-heads are connected by tie-bars *k* which pass between the rolls.

The parts of the bearing are assembled by setting the hub in the center of the casing and then applying each of the roll-sections and its washer *c'* with the spindle *f* therein, to the seats at one side of the ribs *b'* and *e;* the opposite roll-sections and washer being then applied to the spindles *f* at opposite sides of the ribs, and the gudgeons *l* are then forced into the ends of the spindles, securing the collars *g'* firmly in place and holding the rolls movably upon the spindle with the washers against the ribs *b* and *e*, as shown in Fig. 2. When the rolls are thus secured within the casing upon opposite sides of the ribs, the holes in the cage-heads are fitted to the journals of the spindles, and the heads secured together by the tie-bars, thus forming a permanent guide for the rolls in the casing.

The collars *g* and *g'* fit within the heads of the cage, as shown in Fig. 2, and are thus held from any end movement which would permit the rolls to yield longitudinally under end thrust.

As is well understood in the manufacture of such bearings, the roll-seats and the ribs in the bearing would require grinding to give them a perfect form; and Fig. 2 shows the ribs *b* and *e* made separate from the casing and hub and applied thereto by means of cylindrical sleeves *t* and *s* to facilitate the formation and grinding of the ribs. An annular groove *u* is shown upon each of the sleeves adjacent at the base of the rib *b* or *e*, as is usual, to avoid the necessity of grinding the roll-seats close to the rim, as the corner of a grinding-wheel cannot be kept perfectly sharp.

The washers $c'$ perform an important function in enabling the roll-sections to be made of spirally wound strands, and thus secure the elasticity which is due to such feature of construction, while avoiding any abrasion by the chisel-ends of the strands.

It will be understood that the duplex rolls claimed herein are adapted for use in any bearing having the annular rib upon the hub and casing, to resist end thrust.

Having thus set forth the nature of the invention what is claimed herein is:

1. In a roller bearing, the combination, with a hub and casing having guide-ribs thereon at the middle of their length, of duplex rolls having each two sections formed of spirally wound strands, spindles fitted rotatably to the sections and having each an integral collar upon one end and a non-integral collar upon the opposite end, whereby the roll-sections can be applied to the spindles separately at opposite sides of the ribs, washers fitted between the ribs and the adjacent chisel-shaped ends of the roll-strands to prevent abrasion by such chisel-shaped ends, and the collars being arranged and operated to tie the rolls together upon the spindles and thus resist end thrust.

2. In a roller bearing, the combination, with a hub and casing having in one end cylindrical roll-seats $d'$ and $a'$ and in the other end sleeves $s$ and $t$ forming similar roll-seats and provided at their inner ends with annular guide-ribs $v'$ and $b'$, of duplex-rolls having each two sections, spindles fitted rotatably to the sections and having each an integral collar upon one end and a non-integral collar upon the opposite end, whereby the roll-sections can be applied to the spindles separately at opposite sides of the ribs, washers fitted between the ribs and the ends of the rolls, and the collars being arranged and operated to tie the rolls together upon the spindles and thus resist end-thrust.

In testimony whereof I have hereunto set my hand in the presence of two subscribing witnesses.

CHARLES S. LOCKWOOD.

Witnesses:
   G. C. STULTS,
   E. WILLIAMS.